April 20, 1948.  F. Y. DONALDSON  2,440,006
INTERMITTENT FLOW DEVICE
Filed Oct. 26, 1945
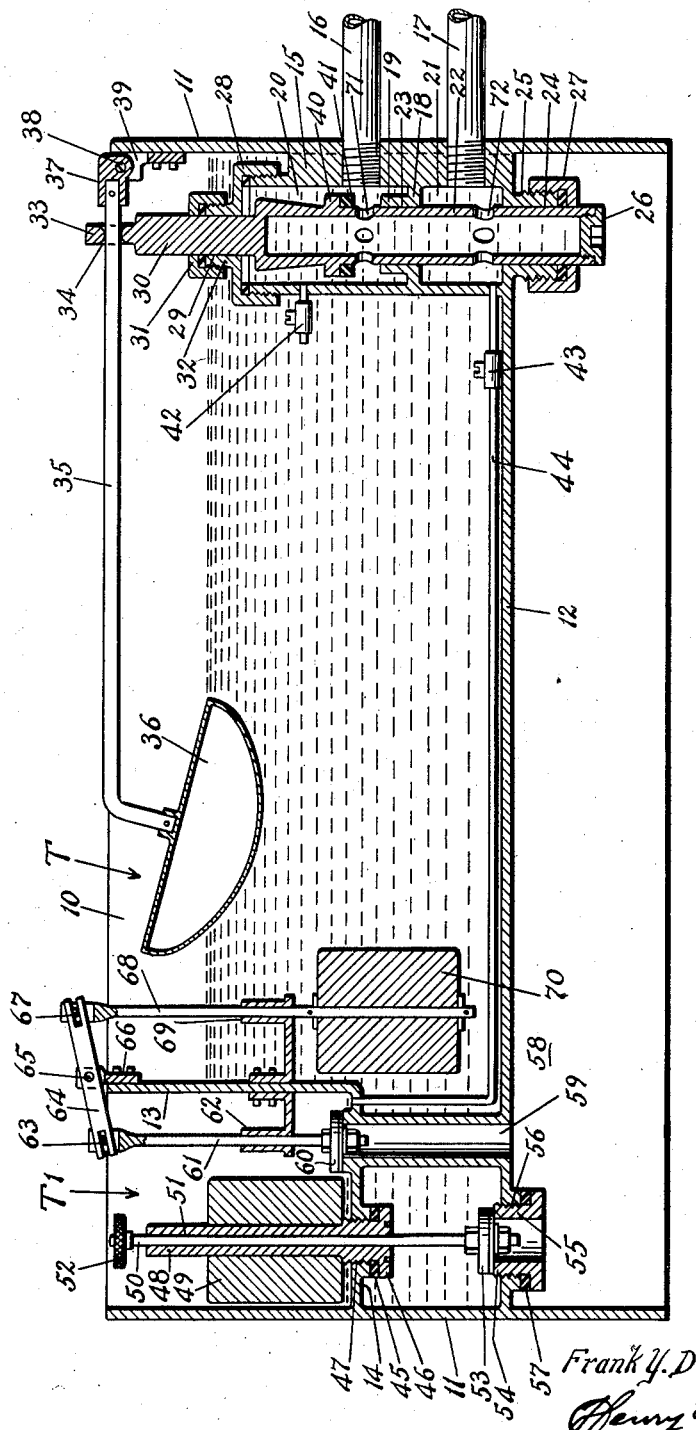
INVENTOR,
Frank Y. Donaldson
By Henry Molz
ATTORNEY.

Patented Apr. 20, 1948

2,440,006

UNITED STATES PATENT OFFICE 2,440,006

INTERMITTENT FLOW DEVICE

Frank Y. Donaldson, Burbank, Calif.

Application October 26, 1945, Serial No. 624,891

3 Claims. (Cl. 137—163)

The primary object of my invention is the provision of a device for attachment to sprinkling, irrigating and other watering systems of similar type, and whereby operating control of the system may economically, effectively and automatically be brought about.

In said respect, the herein described invention is an improvement of that certain similar device for which Letters Patent No. 2,202,549, dated May 28, 1940, were granted me, the improved operating means embodied in the present invention over the foregoing providing numerous highly advantageous features conducive to the more efficient operation of a device having said characteristics.

As with my former invention, an object of the present invention is to provide a device that may readily be installed on existing systems as well as on new systems, and for watering the lawns and gardens of private residence property, as well as large estates, golf courses, country club grounds and cemetery property, as well as for any and all irrigating purposes regardless of type or use.

A further object is the provision of a device for intermittent operation as to both time and flow at regulated volume of flow, and requiring no attention in its operating sequence.

A still further object is the provision of a device noiseless in operation, simple and dependable, fool and trouble proof, and of varying capacities to fully meet the requirements of any and all watering or irrigating problems it will of necessity have to fulfill.

I attain these objects by the device illustrated in the accompanying drawing, in which the figure shown is a vertical section taken along the center line of the invention, and wherein numerals of reference indicate component parts of the invention. The latter is illustrated as embodying a main control tank T having side walls 10, end walls 11, and a bottom 12.

A timing tank T1 is provided within the main control tank T by providing a crosswall 13 and a second bottom 14 adjacent one end of the tank T.

A valve body 15 is shown as formed integral with the other end of the tank T, but may as readily be attached to said tank in any other suitable manner.

An inlet pipe 16 from the source of water supply and an outlet pipe 17 to the irrigation fixture (not shown) are connected into the valve body 15.

A horizontal partition 18 forming a valve seat 19 is provided within the valve body 15, thereby providing a chamber 20 fed by the pipe 16 and divided from a chamber 21, bled by the pipe 17.

A sliding tubular valve 22 reciprocates vertically within the valve body 15 in a bore 23 provided through the partition 18, and a bore 24 provided through a boss 25 depending from the bottom 12 and axially aligned with said bore 24.

The valve 22 is closed at its lower end by a plug 26 and reciprocates through a packing gland 27 threaded about the boss 25.

The upper end of the chamber 20 is closed by a cap 28 provided with a bore 29 having the upper, closed and reduced end 30 of the valve 22 reciprocating therethrough.

A packing gland 31 threaded about a boss like portion 32 of the cap 28 provides a water seal for the upper end of the valve body 15.

The valve 22 is further reduced adjacent its upper end to provide a valve stem 33 having an aperture 34 therethrough.

A float rod 35 having a float 36 depending from its outer end is extended through the aperture 34 into a pivoted supporting member 37 journaled about a pivot pin 38 fixed in a bracket 39 fixed to the end wall 11 adjacent the valve body 15.

The valve 22 is provided with an annular shoulder 40 supporting a gasket 41 positioned within the chamber 20 so as to seat upon the valve seat 19 when the valve 22 is moved downwardly.

A small adjustable valve 42 controls an outflow of water from the chamber 20 into the tank T. A similar valve 43 controls an outflow of water from the chamber 21 into the tank T1 through a tube 44.

A gasket 45 assures a water-tight fitting of a plug 46 provided in a threaded aperture 47 through the bottom 14 of the tank T1. Said plug 46 is elongated up into the tank T1 to form a vertically disposed post 48, and a float 49 is positioned about said post 48 so as to reciprocate vertically within the tank T1.

A valve stem 50 reciprocates vertically in a bore 51 provided through the post 48 and the stem 50 has an adjustable nut 52 at its upper end and a disk valve 53 at its lower end designed to seat upon a valve seat 54 formed by a sleeve 55 threaded into an aperture 56 provided through the bottom 12.

A gasket 57 provides a water seal between the sleeve 55 and the bottom 12.

A water passage way is provided from the tank T1 into a space 58 below the bottom 12 by a tube 59. Said space 58 is provided by extending the walls 10 and the ends 11 down below the level of the bottom 12.

The upper end of the tube 59 is finished to provide a valve seat for a valve 60 having a stem 61 extended upwardly through a supporting bracket 62 to a pivot pin 63 connecting the stem 61 to one end of a rocker arm 64 pivoted at its center on a pin 65 fixed in a bracket 66 attached to the wall 13.

The other end of the rocker arm 64 is pivotally connected by a pin 67 to a depending float stem 68 extended through a supporting bracket 69 and carrying a float 70 at its lower end.

The bracket 62 is fixed to the tank T1 side of the wall 13, and the bracket 69 is fixed to the tank T side of said wall 13, thus positioning the valve 60 within the tank T1, and the float 70 in the tank T.

Apertures 71 are provided through the valve 22 so that when the valve is open, water may enter the interior of said valve from the chamber 20. Likewise apertures 72 are provided through the valve 22 so that when said valve is open, water may exit from the interior thereof into the chamber 21.

In its operation, the device is extremely simple. At the beginning of its operation, the main control tank T and the timing tank T1 are both empty and the floats 36, 49 and 70 are all at the bottom of the respective tanks. The valve 42 is then adjusted so that the time required to fill tank T will be the time desired to have the water shut off from the pipe 17 and the irrigation fixture (not shown).

The water will then drip or trickle from the valve 42 and gradually fill the tank T until the float 36 rises to approximately the position shown in the drawing, which will in turn raise the valve 22 and permit water to flow from the pipe 16 and the chamber 20 through the apertures 71 into the interior of the valve 22 and in turn out through the apertures 72 into the chamber 21 and into the outlet pipe 17.

Prior to the time required to lift the float 36 to its upper limit, the float 70 has been lifted to tilt the rocker arm 64 and thereby close the valve 60.

Water under pressure in the chamber 21 will thereupon pass through the valve 43 which has been adjusted so that the water will trickle through the tube 44 into the tank T1. The adjustment of said valve 43 will determine the time to fill the tank T1 which will be the time desired for the water to be flowing through the pipe 17.

The float 49 will raise during the filling of the tank T1, and at near the end of the time desired for the water to be flowing through the pipe 17, the float 49 will contact the nut 52 and thereby lift the valve 53 from its seat and empty the tank T.

As the water is lowered or recedes in tank T, the float 36 will recede therewith and in turn cause the valve 22 to lower until the apertures 71 and 72 are closed within the bores 23 and 24 respectively, and the gasket 41 is seated upon the valve seat 19, thereby shutting off the water from pipe 17.

As the float 36 approaches its lowermost position, the float 70 will also lower or recede until the valve 60 is opened, and thereby empty the tank T1 which will in turn lower the float 49 to permit the valve 53 to close. However, the float 70 is so positioned that the valve 60 will not be opened until the water in tank T will be lowered to a pre-fixed level so that sufficient time will elapse for all water to run out of tank T before the closing of the valve 53.

After said valve 53 closes, the float 70 will remain down and the valve 60 will remain open a sufficient length of time for the water to run out of tank T1. Thereafter will begin a new cycle of operation, for, with the valve 53 closed, and water again trickling into tank T, and with valve 60 open until the water has again filled the tank T sufficiently to lift the float 70 and to close said valve, an additional period of elapsed time will cause the incoming water to further raise the float 36 to the position shown in the drawing. Thereafter, the cycle of operation as herein described will automatically repeat itself and continue as long as it is so desired.

Experience with the device has amply demonstrated the fact that it will do all that is claimed for it. Moreover, it has been found that due to the elongation of the tubular valve 22, a cushioning effect is produced that prevents pounding in the apparatus, so as to render its operation noiseless.

Readily produced from materials the open market affords, and at no great cost, the device unquestionably provides a highly satisfactory intermittent flow watering medium.

I am aware that slight modifications may from time to time be made in the details of structure illustrated without departing, however, from the scope of the herein invention, and as defined in the claims which are appended hereto. Hence, I do not limit my present invention to the exact description or embodiment of structure herein disclosed, but what I do claim is:

1. In a device for controlling the flow of liquid under pressure from a supply line into a service line, a main control tank, a valve chamber associated with said tank and having an intake port for connection with said supply line, an outlet port for connection with said service line, and a valve seat between said ports; a main valve member constructed and arranged to permit flow through said chamber from the intake port to said outlet port when lifted off said seat and to shut off such flow when seated on said seat, means for continuously supplying liquid to said main control tank from said intake port, a float operated means arranged to unseat said main valve member when the level of liquid in said tank rises above a predetermined level and to seat said valve when the liquid level in said tank lowers to a predetermined point, said tank having a discharge opening, a main tank discharge valve for controlling said discharge opening, a timing tank associated with said main tank and having a discharge opening, a timing tank discharge valve for controlling the discharge opening of said timing tank, means operable only when said main valve is unseated for supplying liquid to said timing tank, a float operated means constructed and arranged for opening said main tank discharge valve when the level of the liquid in the timing tank reaches a predetermined high point and for closing said main tank discharge valve when a predetermined amount of liquid has been discharged through the discharge opening of said timing tank, and a float operated means in said main tank constructed and arranged to close the timing tank discharge valve before the liquid in the main tank reaches the level at which the main valve is unseated and to maintain said timing tank discharge valve closed after said main valve is unseated, and finally operating to open said timing tank discharge valve when the level of the liquid in said main tank is lowered to a predetermined point following the opening of said main tank discharge valve, whereby the time required to fill the timing tank to the level at which the main tank discharge valve is opened is the approximate time during which the main valve is unseated and the time required for filling the main tank to the level at which the main valve is unseated is the interval of time during which the main valve is seated.

2. In a device for controlling the flow of liquid under pressure from a supply line into a service line, a main control tank, a valve chamber associated with said tank and having an intake port for connection with said supply line, an outlet port for connection with said service line, and a valve seat between said ports; a main valve member constructed and arranged to permit flow through said chamber from the intake port to said outlet port when lifted off said seat and to shut off such flow when seated on said seat, means for continuously supplying liquid to said main control tank and from said intake port, a float operated means arranged to unseat said main valve member when the level of liquid in said tank rises above a predetermined level and to seat said valve when the liquid level in said tank lowers to a predetermined point, said tank having a discharge opening, a main tank discharge valve for controlling said discharge opening, a timing tank associated with said main tank and having a discharge opening, a timing tank discharge valve for controlling the discharge opening of said timing tank, a conduit receiving liquid from a point in said valve chamber between said seat and said outlet port for conducting liquid to said timing tank, a float operated means constructed and arranged for opening said main tank discharge valve when the level of the liquid in the timing tank reaches a predetermined high point and for closing said main tank discharge valve when a predetermined amount of liquid has been discharged through the discharge opening of said timing tank, a float operated means in said main tank constructed and arranged to close the timing tank discharge valve before the liquid in the main tank reaches the level at which the main valve is unseated and to maintain said timing tank discharge valve closed after said main valve is unseated, and finally operating to open said timing tank discharge valve when the level of the liquid in said main tank is lowered to a predetermined point following the opening of said main tank discharge valve, whereby the time required to fill the timing tank to the level at which the main tank discharge valve is opened is the approximate time during which the main valve is unseated and the time required for filling the main tank to the level at which the main valve is unseated is the interval of time during which the main valve is seated, and an adjustable valve in said conduit for varying the volume of liquid being supplied to the timing tank to vary the time during which the main valve is unseated.

3. In a device for controlling the flow of liquid under pressure from a supply line into a service line, a main control tank, a valve chamber associated with said tank and having an intake port for connection with said supply line, an outlet port for connection with said service line, and a valve seat between said ports; a main valve member constructed and arranged to permit flow through said chamber from the intake port to said outlet port when lifted off said seat and to shut off such flow when seated on said seat, means for continuously supplying liquid to said main control tank from a point in said chamber between said seat and said intake port, a float operated means arranged to unseat said main valve member when the level of liquid in said tank rises above a predetermined level and to seat said valve when the liquid level in said tank lowers to a predetermined point, said tank having a discharge opening, a main tank discharge valve for controlling said discharge opening, a timing tank associated with said main tank and having a discharge opening, a timing tank discharge valve for controlling the discharge opening of said timing tank, a conduit connected at its ends to said valve chamber and said timing tank in such manner that it is operable only when said main valve is unseated for supplying liquid to said timing tank, a float operated means constructed and arranged for opening said main tank discharge valve when the level of the liquid in the timing tank reaches a predetermined high point and for closing said main tank discharge valve when a predetermined amount of liquid has been discharged through the discharge opening of said timing tank, and a float operated means in said main tank constructed and arranged to close the timing tank discharge valve before the liquid in the main tank reaches the level at which the main valve is unseated and to maintain said timing tank discharge valve closed after said main valve is unseated, and finally operating to open said timing tank discharge valve when the level of the liquid in said main tank is lowered to a predetermined point following the opening of said main discharge valve, whereby the time required to fill the timing tank to the level at which the main tank discharge valve is opened is the approximate time during which the main valve is unseated and the time required for filling the main tank to the level at which the main valve is unseated is the interval of time during which the main valve is seated, and adjustable means for varying the volume of the continuous supply of liquid from said valve chamber into said main tank.

FRANK Y. DONALDSON.

REFERENCES CITED

The following references are of record in the file of this patent:

UNITED STATES PATENTS

| Number | Name | Date |
| --- | --- | --- |
| 748,046 | Byers | Dec. 29, 1903 |
| 976,870 | Guyton | Nov. 29, 1910 |
| 2,202,549 | Donaldson | May 28, 1940 |